US009889548B2

(12) United States Patent
Sattler

(10) Patent No.: US 9,889,548 B2
(45) Date of Patent: Feb. 13, 2018

(54) ADAPTIVE TRANSMISSION MECHANISM

(71) Applicant: Hilti Aktiengesellschaft, Schaan (LI)

(72) Inventor: Christian Sattler, Biessenhofen (DE)

(73) Assignee: Hilti Aktiengesellschaft, Schaan (LI)

( * ) Notice: Subject to any disclaimer, the term of this patent is extended or adjusted under 35 U.S.C. 154(b) by 25 days.

(21) Appl. No.: 15/123,926

(22) PCT Filed: Mar. 6, 2015

(86) PCT No.: PCT/EP2015/054699
§ 371 (c)(1),
(2) Date: Sep. 6, 2016

(87) PCT Pub. No.: WO2015/132373
PCT Pub. Date: Sep. 11, 2015

(65) Prior Publication Data
US 2017/0014985 A1    Jan. 19, 2017

(30) Foreign Application Priority Data
Mar. 7, 2014   (EP) .................... 14158227

(51) Int. Cl.
*B25F 5/00*    (2006.01)
*B23B 47/26*   (2006.01)
(Continued)

(52) U.S. Cl.
CPC .............. *B25F 5/001* (2013.01); *B23B 47/26* (2013.01); *B23B 49/00* (2013.01); *B28D 1/041* (2013.01);
(Continued)

(58) Field of Classification Search
CPC ....... B25F 5/001; B25B 23/147; B25B 21/00; B23B 2270/486; B23B 2260/07;
(Continued)

(56) References Cited

U.S. PATENT DOCUMENTS 8,746,364 B2 *   6/2014   Atsumi ................... B25F 5/001
                                                              173/176
8,888,655 B2 *  11/2014   Saur ......................... B25F 5/00
                                                              477/107
(Continued)

FOREIGN PATENT DOCUMENTS

DE    102011089771    6/2013
EP       0100435 B1    2/1984
(Continued)

*Primary Examiner* — Daniel Howell
(74) *Attorney, Agent, or Firm* — Davidson, Davidson & Kappel, LLC

(57) ABSTRACT

A method to control a power tool includes the following steps: ascertaining a first rotational speed of the transmission in a first gear; ascertaining a first rotational speed of the motor when the transmission has been put into a first gear; ascertaining the selection of a first gear on the basis of the ratio of the rotational speed of the transmission and the rotational speed of the motor on the basis of a look-up table; selecting the no-load state; ascertaining the selected no-load state on the basis of the ratio of the rotational speed of the transmission and the rotational speed of the motor on the basis of a look-up table; adapting the rotational speed of the motor to a second gear on the basis of a ratio of the rotational speed of the transmission and the rotational speed of the motor on the basis of a look-up table; and selecting a second gear.

6 Claims, 3 Drawing Sheets

(51) Int. Cl.
  *B23B 49/00* (2006.01)
  *B28D 1/04* (2006.01)
  *G05B 19/404* (2006.01)
  *B25B 21/00* (2006.01)

(52) U.S. Cl.
  CPC ........ *G05B 19/404* (2013.01); *B23B 2260/07* (2013.01); *B23B 2270/32* (2013.01); *B23B 2270/486* (2013.01); *B25B 21/008* (2013.01); *G05B 2219/37297* (2013.01); *G05B 2219/41183* (2013.01); *G05B 2219/41184* (2013.01); *Y10T 408/165* (2015.01)

(58) Field of Classification Search
  CPC ........ G05B 19/404; G05B 2219/41184; G05B 2219/41183; Y10T 408/165
  USPC ........................................ 173/176, 179, 217
  See application file for complete search history.

(56) References Cited

U.S. PATENT DOCUMENTS

| | | | |
|---|---|---|---|
| 9,193,055 B2* | 11/2015 | Lim | B25F 5/001 |
| 2013/0165292 A1 | 6/2013 | Brugger et al. | |
| 2015/0034348 A1* | 2/2015 | Yoshida | B24B 23/028 |
| | | | 173/176 |
| 2015/0122523 A1* | 5/2015 | Yamamoto | B25F 5/001 |
| | | | 173/2 |
| 2016/0193673 A1* | 7/2016 | Yoshida | B23D 47/12 |
| | | | 30/388 |
| 2017/0274487 A1* | 9/2017 | Sattler | B23Q 5/142 |

FOREIGN PATENT DOCUMENTS

| | | |
|---|---|---|
| EP | 2077177 | 7/2009 |
| EP | 2650085 | 10/2013 |

* cited by examiner

ADAPTIVE TRANSMISSION MECHANISM

The present invention relates to a method to control a power tool, especially a core drill, comprising a motor as the drive for the power tool, a control unit, a transmission having at least a first gear, a second gear as well as a no-load state, a tool such as, for instance, a core bit, a first sensor to detect the rotational speed of at least one component of the transmission and a second sensor to detect the rotational speed of the motor.

Moreover, the invention relates to a power tool, especially a core drill, comprising a motor as the drive for the power tool, a control unit, a transmission having at least a first gear, a second gear as well as a no-load state, a tool such as, for instance, a core bit, a first sensor to detect the rotational speed of at least one component of the transmission and a second sensor to detect the rotational speed of the motor, for purposes of using the method according to the invention.

BACKGROUND

Power tools such as, for example, core drills, generally serve to drill holes into mineral materials such as for instance, concrete or bricks. In this context, the core drill normally has an electric motor, a transmission, a control unit or control device, a tool socket as well as a tool in the form of a core bit. Via the transmission, the electric motor drives the tool socket together with the tool. The transmission normally has two gears as well as a no-load state, which can be selected or actuated manually by the user of the core drill. By means of the individual gears, the motor speed is stepped up or down to the drive speed in different ways. In this manner, depending on the transmission ratio, either a high rotational speed and a low torque, or else a low rotational speed and a high torque can be available at the core bit. Once the core bit has been made to rotate, it cuts a circular hole into the material by means of its diamond-tipped cutting edge, thereby creating a cylindrical drill core. This drill core is removed from the drilled hole at the end of the drilling or cutting procedure.

A core drill according to the state of the art is disclosed in German patent application DE 10 2011 089 771. This power tool configured as a core drill comprises a drive means with a drive motor and a drive shaft, a driven means with a driven shaft, a transmission with a planetary gear train and an additional gear unit as well as a device for changing between a first and a second gear speed step of the planetary gear train.

A widespread problem encountered with the core drills according to the state of the art is to be seen in the unsynchronized transmissions, which makes changing from one gear into another gear awkward and time-consuming. Owing to the rotational speed difference between the motor (as the drive element) and the next gear (as the driven element) that is to be selected, changing gears with a unsynchronized transmission is only possible when the driven shaft is stationary (that is to say, not rotating) and the motor is turned off. In order to then finally change the gear, the driven shaft has to be turned by hand into the correct position until the corresponding gear wheels of the drive shaft and of the driven shaft are intermeshing and connected with a positive fit.

SUMMARY OF THE INVENTION

A gear change carried out in this manner is time-consuming and consequently inefficient since, for every gear change, first the motor and then the transmission have to be brought to a complete standstill and subsequently have to be put into operation once again.

It is an object of the present invention to solve the above-mentioned problem and provide a method to control a power tool, especially a core drill, as well as to put forward a power tool, especially a core drill, that uses this method, by means of which the gear can be changed faster and more effectively.

For this purpose, a method is shown to control a power tool, especially a core drill, comprising:
- a motor as the drive for the power tool;
- a control unit;
- a transmission having at least a first gear and a second gear;
- a tool, for instance, a core bit;
- a first sensor to detect the rotational speed of at least one component of the transmission; and
- a second sensor to detect the rotational speed of the motor.

According to the invention, the following method steps are provided:
- ascertaining a first rotational speed of the at least one component of the transmission when the transmission has been put into a first gear,
- ascertaining a first rotational speed of the motor when the transmission has been put into a first gear,
- ascertaining the selection of the first gear on the basis of a first prescribed ratio of the first rotational speed of the at least one component of the transmission and of the first rotational speed of the motor on the basis of a look-up table,
- selecting the no-load state of the transmission,
- ascertaining the selected no-load state on the basis of a second prescribed ratio of a second rotational speed of the at least one component of the transmission and of a second rotational speed of the motor on the basis of the look-up table,
- adapting the rotational speed of the motor to a second gear on the basis of a third prescribed ratio of a third rotational speed of the at least one component of the transmission and of a third rotational speed of the motor on the basis of the look-up table, and
- selecting a second gear.

The first gear here can be lower or higher than the second gear. By means of the appropriate adaptation of the rotational speed of the motor to the lower or higher gear, the gear can be changed while the drive shaft is rotating, as a result of which the gear can be changed altogether faster and more efficiently.

Moreover, a power tool is shown, especially a core drill, comprising:
- a motor as the drive for the power tool;
- a control unit;
- a transmission having at least a first gear and a second gear;
- a tool, for example, a core bit;
- a first sensor to detect the rotational speed of at least one component of the transmission; and
- a second sensor to detect the rotational speed of the motor, for purposes of using the method according to the invention.

According to another advantageous embodiment of the present invention, it can be provided that the rotational speed of the motor is adapted by increasing the rotational speed of the motor. Through the increase of the rotational speed of the motor, the rotational speed is adapted to the higher rotational speed of the lower gear in such a way that it is possible to change into the lower gear while the drive shaft and the driven shaft are rotating.

Moreover, accordingly, an additional advantageous embodiment of the present invention can be provided that the rotational speed of the motor is adapted by decreasing the rotational speed of the motor. Through the decrease of the rotational speed of the motor, the rotational speed is adapted to the lower rotational speed of the higher gear in such a way that it is possible to change into the higher gear.

Additional advantages can be gleaned from the figure description below. The figures depict various embodiments of the present invention. The figures, the description and the claims contain numerous features in combination. Whenever appropriate, the person skilled in the art will also consider the features individually and unite them to create additional meaningful combinations

BRIEF DESCRIPTION OF THE DRAWINGS

The following is shown.

DETAILED DESCRIPTION

Figure 1:
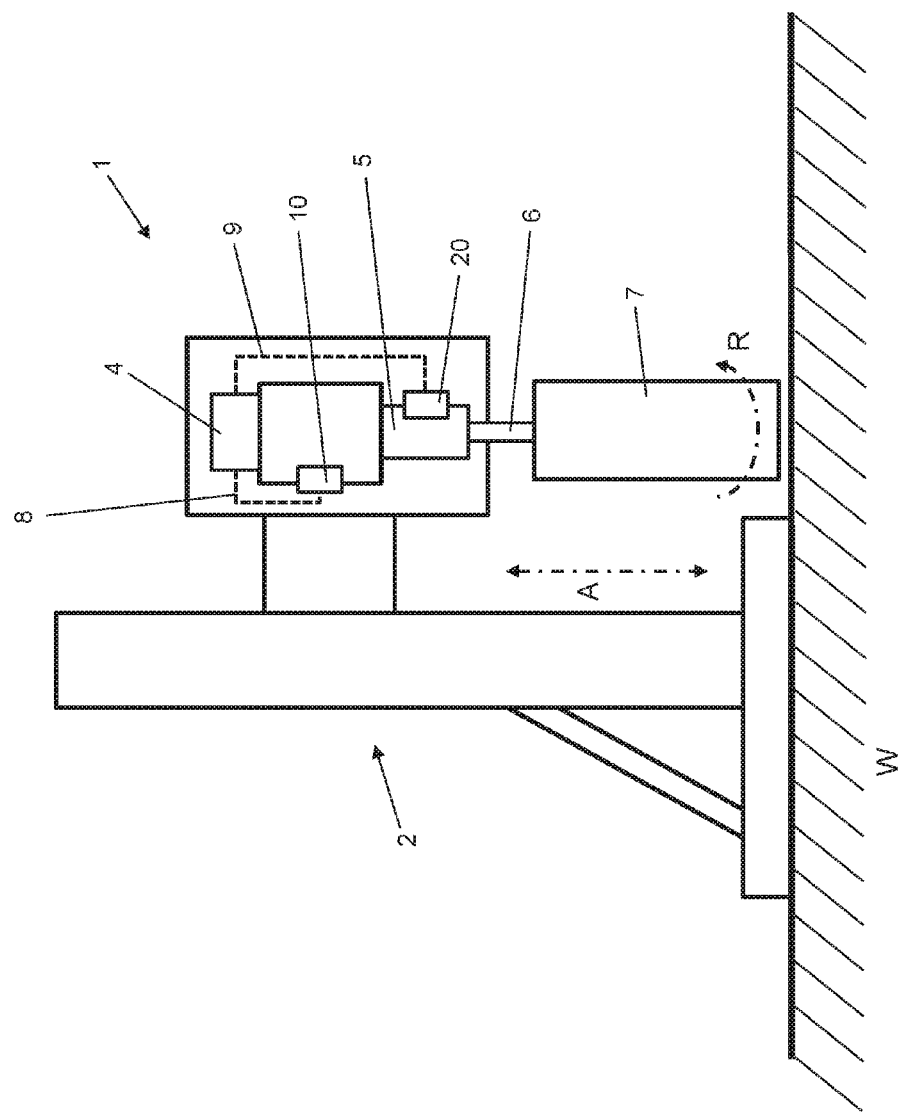
FIG. 1: a power tool configured as a core drill according to the invention, comprising a motor, a control unit, a transmission, a tool configured as a core bit, a first sensor and a second sensor.

FIG. 1 shows a power tool 1 configured as a core drill that is attached to a drill stand 2. By means of the drill stand 2, the core drill 1 can be reversibly moved along the double-arrow direction A towards as well as away from the workpiece W that is to be worked. The material W is concrete.

The core drill 1 has a motor 3, a control unit 4, a transmission 5, a driven shaft 6, a tool 7 configured as a core bit, a first sensor 10 to detect the rotational speed of the transmission 5 and a second sensor 20 to detect the rotational speed of the motor 3. Any type of electric motor can be used as the motor 3.

The motor 3 is configured as an electric motor and it serves to drive the core bit 7. The motor 3 has a drive shaft that is detachably connected to the transmission 5. This connection is established by a coupling means. The core bit 7 is made to rotate by means of the transmission 5 and the driven shaft 6. The torque generated in the motor 3 is thus correspondingly transmitted to the core bit 7 in order to cut a hole into the material W.

The transmission 5 has a first gear, a second gear as well as a no-load state, and it is positioned between the drive shaft of the motor 3 and the driven shaft 6. The individual gears can be selected manually by means of a gear-speed selector in order to thus vary the transmission of the rotational speed and of the torque from the motor 3 to the driven shaft 6 or to the core bit 7.

The first sensor 10 is positioned on the transmission 5 in such a way as to detect the rotational speed of the gear that is currently selected. The second sensor 20, in contrast, is positioned in such a way as to detect that the rotational speed of the motor 3.

The control unit 4 is connected to the first sensor 10 via a first line 8 and to the second sensor 20 via a second line 9, and this is done in such a way that that rotational speed values measured by the sensors 10, 20 are transmitted to the control unit 4. Moreover, the control unit 4 is connected to the motor 3 in such a way that the control unit 4 can vary the rotational speed of the motor 3 directly. The control unit 4 has a data memory unit where a look-up table (transmission ratio table) is stored. The gear that is currently selected can be ascertained with this look-up table on the basis of the ratio of the rotational speed of the motor 3 and of the corresponding rotational speed of the transmission 5. Thanks to the connection of the control unit 4 to the motor 3, the control unit 4 can act upon the motor 3, that is to say, it can automatically increase or decrease the rotational speed of the motor 3.

Figure 2:
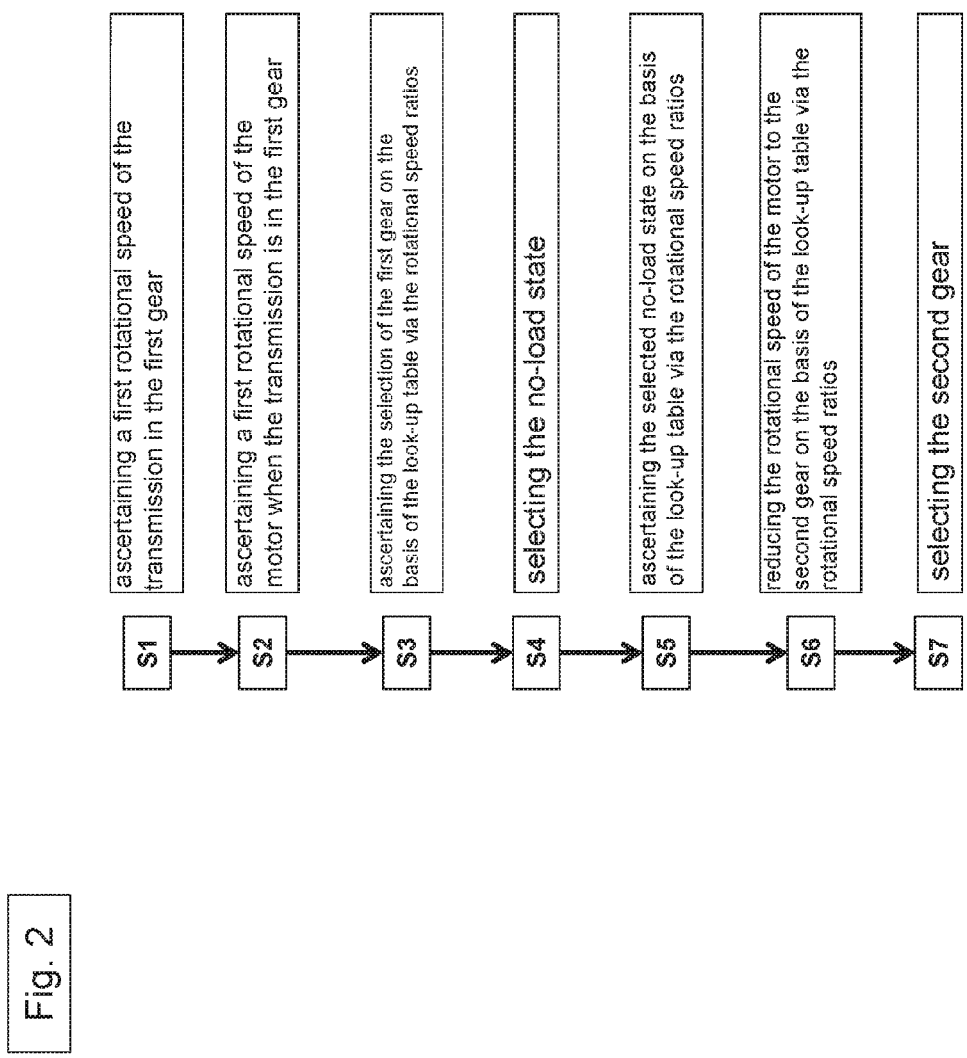
FIG. 2: a first flow chart of the method according to the invention.

FIG. 2 shows the course of the gear changing from a first gear into a second gear (that is to say, higher) gear on the basis of the method according to the invention.

Towards this end, in step S1, the first sensor ascertains the rotational speed of the transmission 5 in the first gear.

In step S2, the rotational speed of the motor 3 is ascertained by the second sensor.

In step S3, the selection of the first gear is ascertained on the basis of the look-up table stored in the data memory unit as well as on the basis of the ascertained rotational speed of the motor 3 and of the transmission 5.

In step S4, the no-load state is selected in the transmission 5. As already described above, this is done by means of a gear selector (not shown here).

In step S5, the selection of the no-load state is ascertained on the basis of the look-up table as well as on the basis of the ascertained rotational speed of the motor 3 and of the transmission 5.

In step S6, the control unit 4 as well as the data acquired in steps S3 and S5 are used to first ascertain that initially, the first gear had been selected and that subsequently the no-load state had been selected. On the basis of this operation or on the basis of the appertaining data, the control unit 4 ascertains that the user would now like to select the core drill 1 into the second, that is to say, the higher, gear. In order to coordinate, that is to say, to synchronize, the rotational speed of the motor 3 and the rotational speed of the transmission 5 so as to attain a fast and efficient gear change, the rotational speed of the motor 3 is reduced to the rotational speed that is stored in the look-up table for the second gear. Once the rotational speed of the motor 3 has been adapted (reduced) to the appropriate rotational speed of the second gear, this is indicated to the user by means of a signal. The signal is generated by a signaling device that is not shown or described in greater detail here. In this context, the signal can be of a visual and/or acoustic nature. Thanks to the signal, the user is now able to recognize when and that the rotational speed of the motor 3 as well as of the transmission 5 are synchronous with each other in order to quickly and efficiently select the second gear in step S7.

Figure 3:
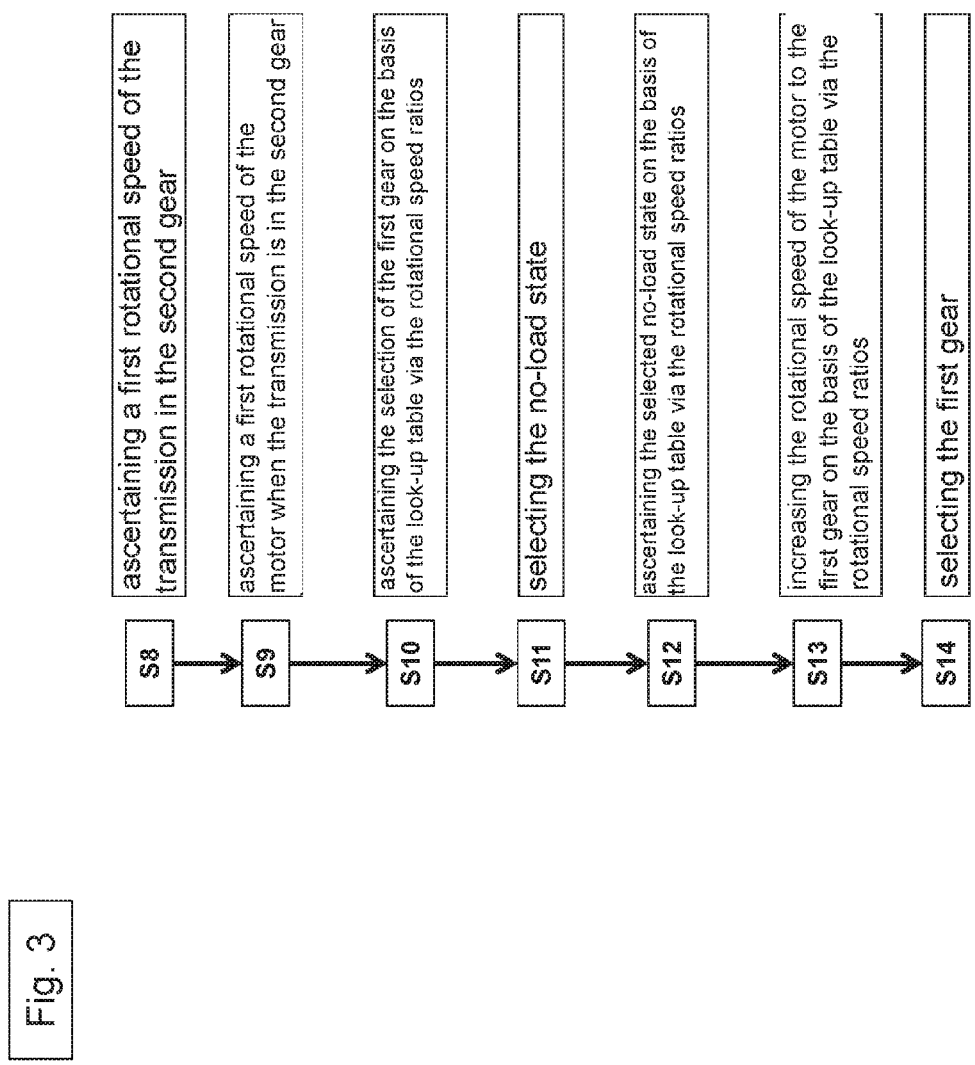
FIG. 3: a second flow chart of the method according to the invention.

In contrast to FIG. 2, FIG. 3 shows the course of a changing procedure from the second gear to the first (that is to say, lower) gear on the basis of the method according to the invention.

For this purpose, in step S8, the first sensor ascertains the rotational speed of the transmission 5.

In step S9, the second sensor ascertains the rotational speed of the motor 3.

In step S10, the selecting of the second gear is ascertained on the basis of the look-up table as well as on the basis of the ascertained rotational speed of the motor 3 and of the transmission 5.

In step S11, the no-load state is selected in the transmission 5. As already described above, this is done by means of a gear selector.

In step S12, the selecting of the no-load state is ascertained on the basis of the look-up table as well as on the basis of the ascertained rotational speed of the motor 3 and of the transmission.

In step S13, the control unit 4 as well as the data acquired in steps S10 and S12 are used to ascertain that initially, the second gear had been selected and that subsequently the no-load state had been selected. On the basis of this operation or on the basis of the appertaining data, the control unit 4 ascertains that the user would now like to set the core drill 1 into the first, that is to say, the lower, gear. In order to coordinate, that is to say, to synchronize, the rotational speed of the motor 3 and the rotational speed of the transmission 5 so as to attain a fast and efficient gear change, the rotational speed of the motor 3 is reduced to the rotational speed that is stored in the look-up table for the second gear. Once the rotational speed of the motor 3 has been adapted (increased) to the corresponding rotational speed of the second gear, this is indicated to the user by means of the signal already described above. The user is now able to recognize when and that the rotational speed of the motor 3 as well as of the transmission 5 are synchronous with each other in order to quickly and efficiently select the second gear in step S14.

What is claimed is:

1. A method to control a power tool including a motor as a drive for the power tool; a controller; a transmission having at least a first gear, a second gear and a no-load state; a tool; a first sensor to detect a rotational speed of at least one component of the transmission; and a second sensor to detect a motor rotational speed of the motor, the method comprising the following steps:
    ascertaining a first rotational speed of the at least one component of the transmission when the transmission has been put into the first gear;
    ascertaining a first rotational speed of the motor when the transmission has been put into the first gear,
    ascertaining a selection of the first gear on the basis of a first prescribed ratio of the first rotational speed of the at least one component of the transmission and of the first rotational speed of the motor on the basis of a look-up table;
    selecting the no-load state of the transmission;
    ascertaining the selected no-load state on the basis of a second prescribed ratio of a second rotational speed of the at least one component of the transmission and of a second rotational speed of the motor on the basis of the look-up table;
    adapting the motor rotational speed of the motor to a second gear on the basis of a third prescribed ratio of a third rotational speed of the at least one component of the transmission and of a third rotational speed of the motor on the basis of the look-up table; and
    selecting a second gear.

2. The method as recited in claim 1 wherein the rotational speed of the motor is adapted by increasing the motor rotational speed of the motor.

3. The method as recited in claim 1 wherein the rotational speed of the motor is adapted by decreasing the motor rotational speed of the motor.

4. A power tool performing the method as recited in claim 1 comprising:
    the motor as the drive for the power tool;
    the controller;
    the transmission having at least the first gear and the second gear;
    the tool;
    the first sensor to detect the rotational speed of the at least one component of the transmission; and
    the second sensor to detect the motor rotational speed of the motor.

5. A method to control a core drill including a motor as a drive for the core drill; a controller; a transmission having at least a first gear, a second gear and a no-load state; a core bit; a first sensor to detect a rotational speed of at least one component of the transmission; and a second sensor to detect a motor rotational speed of the motor, the method comprising the following steps:
    ascertaining a first rotational speed of the at least one component of the transmission when the transmission has been put into the first gear;
    ascertaining a first rotational speed of the motor when the transmission has been put into the first gear,
    ascertaining a selection of the first gear on the basis of a first prescribed ratio of the first rotational speed of the at least one component of the transmission and of the first rotational speed of the motor on the basis of a look-up table;
    selecting the no-load state of the transmission;
    ascertaining the selected no-load state on the basis of a second prescribed ratio of a second rotational speed of the at least one component of the transmission and of a second rotational speed of the motor on the basis of the look-up table;
    adapting the motor rotational speed of the motor to a second gear on the basis of a third prescribed ratio of a third rotational speed of the at least one component of the transmission and of a third rotational speed of the motor on the basis of the look-up table; and
    selecting a second gear.

6. A core drill performing the method as recited in claim 5 comprising:
    the motor as the drive for the core drill;
    the controller;
    the transmission having at least the first gear and the second gear;
    the core bit;
    the first sensor to detect the rotational speed of the at least one component of the transmission; and
    the second sensor to detect the motor rotational speed of the motor.

* * * * *